United States Patent

Wells

[15] 3,685,051

[45] Aug. 15, 1972

[54] HOLOGRAPHIC IMAGING SYSTEM USING CROSSED LINEAR ARRAYS OF ENERGY SOURCES AND SENSORS

[72] Inventor: Willard H. Wells, Altadena, Calif.
[73] Assignee: Tetra Tech, Inc., Pasedena, Calif.
[22] Filed: March 6, 1969
[21] Appl. No.: 804,744

[52] U.S. Cl. ............... 343/17, 73/67.5 H, 340/5 H, 343/6 R, 350/3.5
[51] Int. Cl. ........................ G01s 9/00, G01s 9/02
[58] Field of Search ......... 340/5 H; 343/5 R, 6 R, 17; 350/3.5; 73/67.5 H

[56] References Cited

UNITED STATES PATENTS

| | | | |
|---|---|---|---|
| 3,488,656 | 1/1970 | Anderson | 350/3.5 X |
| 3,548,642 | 12/1970 | Flaherty et al. | 73/67.5 H |
| 3,461,420 | 8/1969 | Silverman | 340/5 H |
| 3,450,225 | 6/1969 | Silverman | 340/5 H |

OTHER PUBLICATIONS

" Acoustical Holography of Nonexistent Wavefronts Detected at a Single Point in Space" by Metherell et al., Applied Physics Letters, July 1968, Vol. 13, No. 1, pp. 22– 24.

*Primary Examiner*—Malcolm F. Hubler
*Attorney*—Christie, Parker & Hale

[57] ABSTRACT

An improved and simplified energy propagation and detection system for forming a hologram of an object illuminated with coherent acoustic or radio energy. Coherent wave energy incident on and modified by the object is received and detected at a hologram plane. Photographic film used in conventional optical holography to record interference patterns at the hologram plane is not useful with acoustic or radio energy, and other types of sensors or receivers must therefore be used. In the past, a two-dimensionally scanned receiver or a grid of many fixed receivers has been used at the hologram plane to map energy intensity and phase, and to provide signals from which an optical hologram is constructed. The new system uses a single linear array of receivers in combination with either a single energy source which is mechanically scanned in one dimension, or a linear array of sources oriented transversely to the array of receivers. A major reduction in the total number of sources and receivers is achieved to permit economical mapping of a large hologram plane with resolution adequate for underwater object detection and similar applications.

11 Claims, 14 Drawing Figures

PATENTED AUG 15 1972

INVENTOR.
WILLARD H. WELLS

BY Christie, Parker & Hale
ATTORNEYS

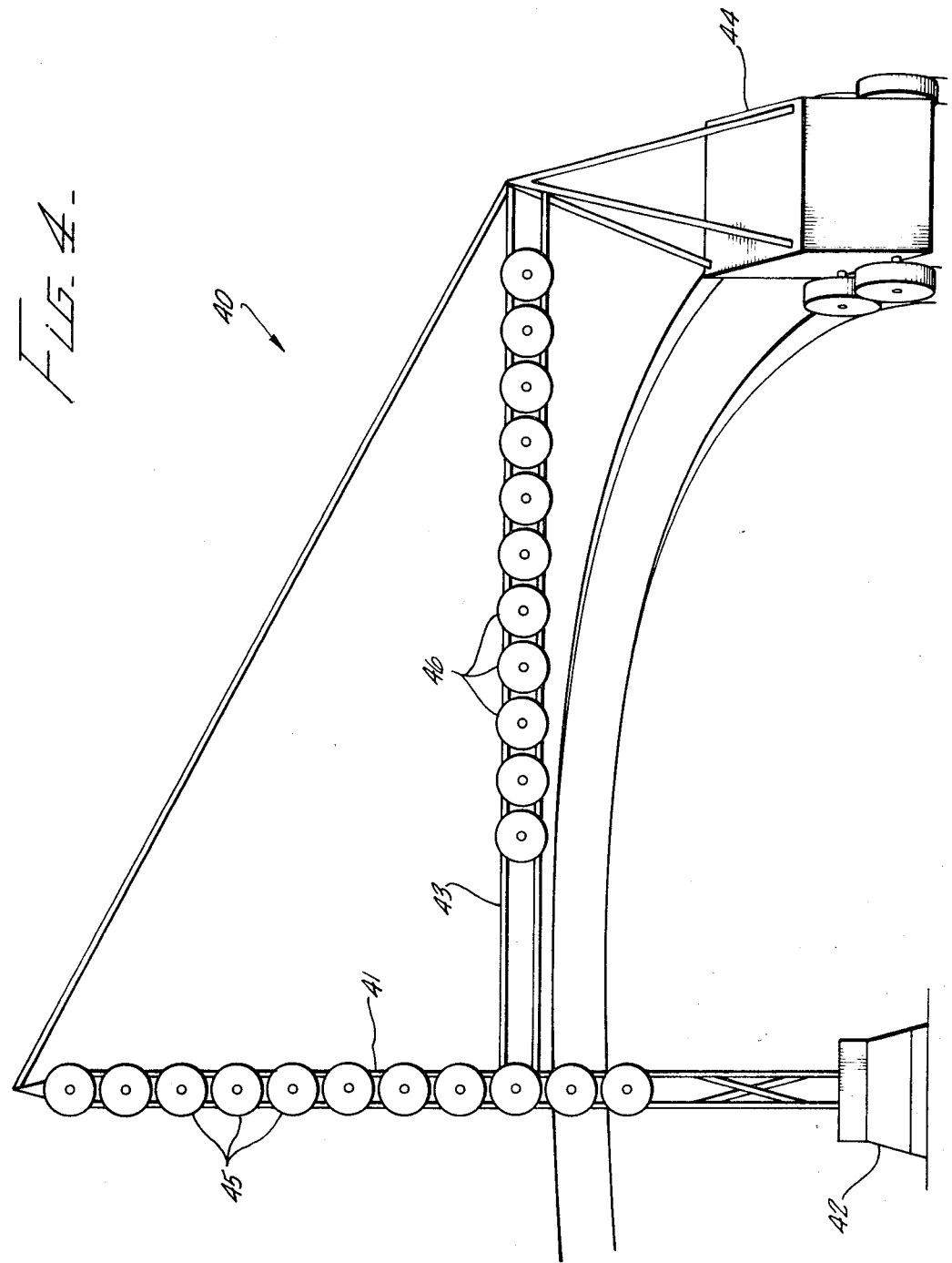

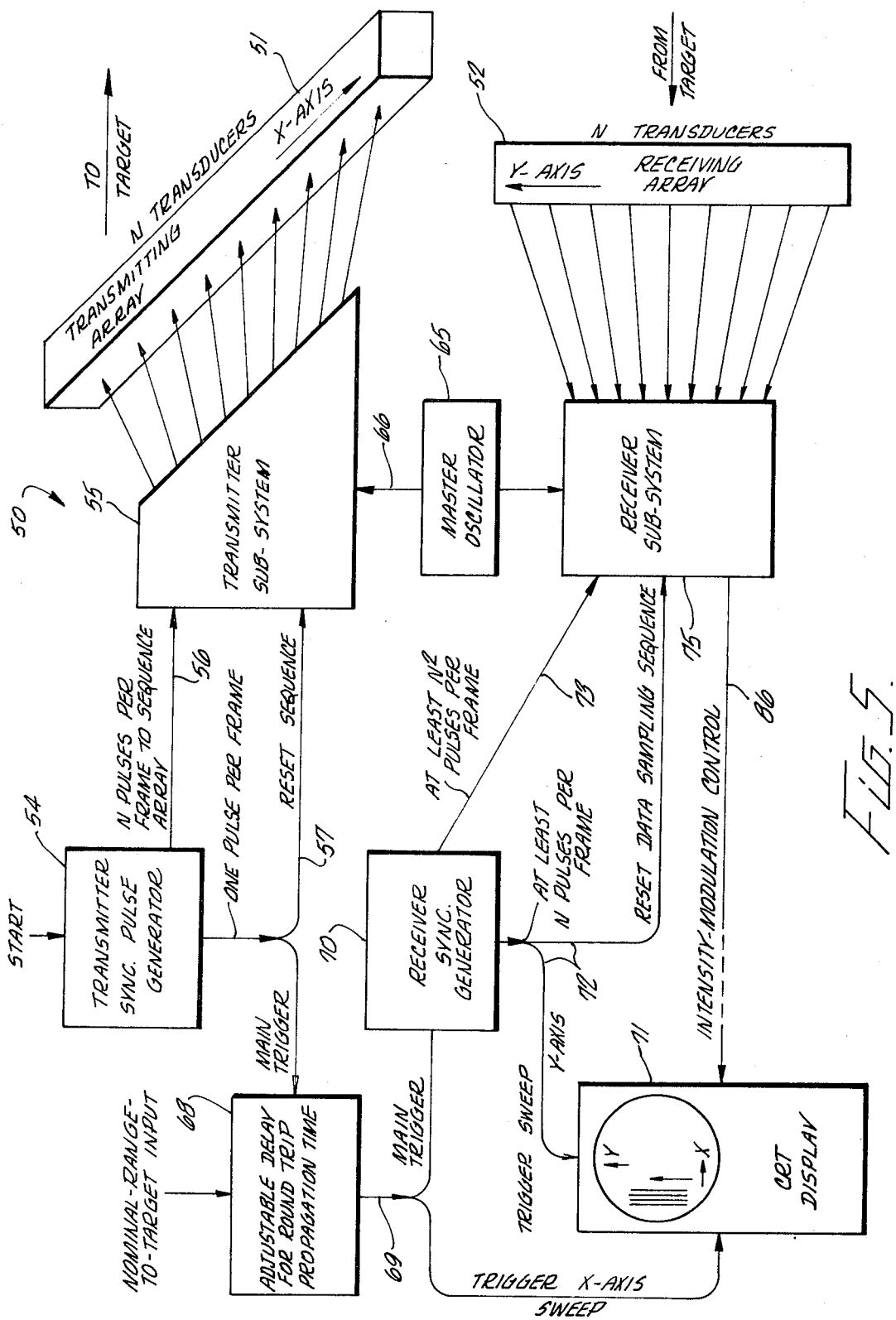

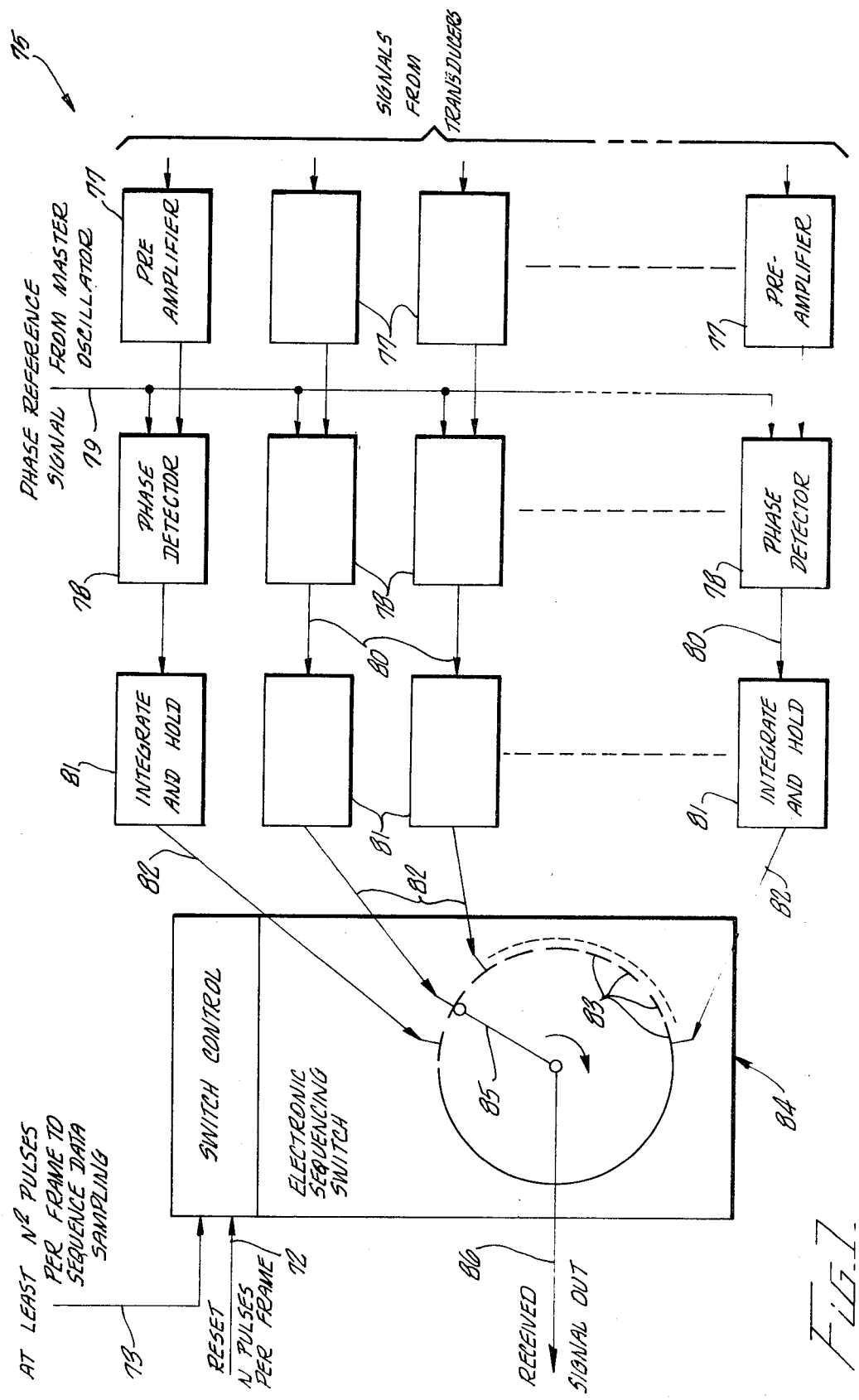

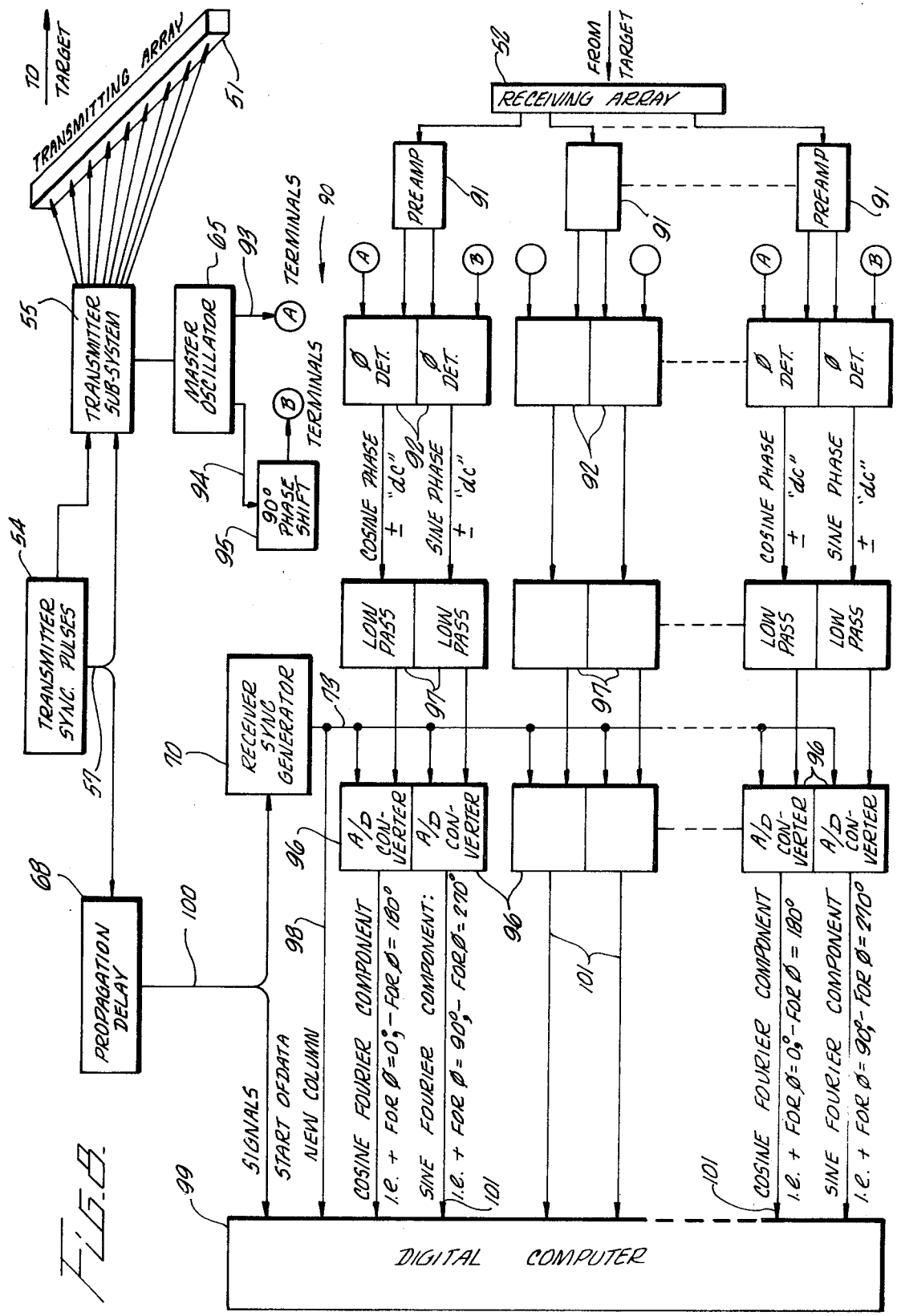

HOLOGRAPHIC IMAGING SYSTEM USING CROSSED LINEAR ARRAYS OF ENERGY SOURCES AND SENSORS

BACKGROUND OF THE INVENTION

Holography is a technique for forming an interference-pattern image of an object which is irradiated with coherent wave energy. The object can be reconstructed and viewed as a real or virtual image by illuminating the interference-pattern image or hologram with coherent light. The principles of optical holography are described in an article titled "Photography by Laser" in the June 1965 issue of "Scientific American."

When the energy which irradiates or illuminates the object is light, the hologram is conventionally formed on photographic film which records a planar pattern of interference fringes, lines and dots arising from the combination of light rays reflected from, scattered by or diffracted around the object, and light rays from a reference beam. The hologram bears no resemblance to the object, but contains amplitude and phase information from which a three-dimensional image of the object can be reconstructed. The light source used in optical holography must emit "coherent" light which is precisely monochromatic. The development of the laser has provided a ready source of coherent light, and has made possible the rapid development of optical holography.

Light is not the only form of wave energy which can be used to form a hologram. Coherent acoustic energy and radio-frequency energy are also useful in holography, and are essential for use in media which do not transmit light. For example, sound energy is well suited for forming holograms of objects immersed in water, and radar microwave energy is useful in aerial holography applications. These energy sources and related holography techniques are described in U.S. Pat. No. 3,400,363 issued on Sept. 3, 1968.

Whatever form of wave energy is used, the interference pattern defining the hologram must be sensed over a finite and often relatively large area of a so-called hologram plane. Light is a very useful form of wave energy as it forms visible interference patterns which can be recorded directly on photographic film positioned at the hologram plane. Film, however, is insensitive to interference patterns created by acoustic or radio energy, and other techniques must be used to sense and record the hologram.

In acoustic holography, for example, it is possible to position an array of many microphones or other acoustic detectors at the hologram plane to measure intensity and phase of incident acoustic waves at many points in the plane. Electrical output signals from the detectors are fed to an oscilloscope to intensity modulate an electron beam which is scanned across the face of a cathode-ray tube to "paint" a visual hologram which is photographed and subsequently used in reproducing the holographed object by conventional optical methods.

It is also possible to use a single microphone or receiver which is mechanically scanned in two dimensions across a raster in the hologram plane. Alternatively, a stationary microphone can be used, and the acoustic energy is emitted from either an array of many spaced-apart energy-emitting sources or from a single source which is mechanically scanned in two directions. All of these systems, however, have inherent shortcomings which have limited the practical application of acoustic holography.

If a two-dimensional array or matrix of either sources or receivers is used, a very large number of components are needed to provide a hologram of adequate resolution. For example, an N-by-N square array of $N^2$ receivers adequate to pick up somewhat less information than presented in a television frame would require about 100,000 receivers and associated electronics. The enormous complexity and high cost of such a system reduces it to a theoretical rather than practical scheme.

Mechanical two-dimensional scanning of either the source or receiver is sometimes a practical approach, but introduces a different set of problems which limit the usefulness of holography in many important applications. The most serious problem is that mechanical scanning requires much more time than is permissible in many practical applications. During the time needed for a full two-dimensional scan of the complete hologram plane, the object must remain stationary (within about a quarter wavelength of the frequency of the irradiating energy) with respect to the sources and receivers, and convection currents or waves in the energy-propagating medium (e.g., seawater) must not move enough to disturb the acoustic phase.

In searching for submerged objects at sea, both the target object and a ship carrying the source and receivers may be in motion with respect to the water and to each other. Furthermore, the relatively long wavelengths suitable for propagation in marine applications require a large-area sensing plane or hologram plane, the diameter of which may range from about 4 to about 30 feet. Mechanical scanning systems are inadequate to complete a two-dimensional scan of a single receiver (or source) over this large raster or matrix in a sufficiently short time to provide a useful hologram. Relative motion between the sources and receivers and the target similarly pose a problem in holographic mapping or object-detection systems using radio-frequency energy.

These problems are overcome by the holography system herein disclosed. In one form, crossed linear arrays of N sources or transmitters and N detectors or receivers provide substantially the same performance as a matrix of $N^2$ sources or receivers. That is, the performance of an economically impractical system using $N^2$ transducers (this term is used herein as referring to both energy sources or transmitters, and energy receivers or detectors) is obtained in the inventive system which uses only 2N transducers. Sensing of information over a large hologram plane is thus made possible without the introduction of the very long time delays inherent in systems using mechanical scanning in two dimensions. In another form, a single source (or receiver) is linearly scanned in one dimension only across a linear array of N receivers (or sources), and a practical system using only N+1 transducers is made possible.

The invention will be described primarily with reference to its use in acoustic holography for underwater detection. The concepts of the invention, however, are equally applicable to holography systems using other forms of wave energy such as radio-frequency energy in radar mapping or detection systems. The invention permits rapid and economically practical sensing of hologram-plane interference patterns which are not in a form suitable for conventional recording on photographic film due to the type of wave energy employed.

SUMMARY OF THE INVENTION

Briefly stated, the invention relates to an improved energy emitting and receiving apparatus for use in a system adapted to form a hologram of an object. The object is irradiated with coherent wave energy, and energy modified by the object is received at a plurality of points in a hologram plane. Amplitude and phase information derived from each of the data points makes possible the formation of a hologram from which an image of the object can be reconstructed by conventional techniques.

The energy emitting and receiving apparatus includes a radiating means arranged as a linear array to emit energy toward the object from a plurality of positions therealong. In one form, the radiating means comprises a plurality of spaced-apart transmitting transducers of an acoustic or microwave type. In another form, a single transmitting transducer is movably mounted to scan along the array. A transmitter control means, including a synchronizing system and a source of coherent energy, is coupled to the radiating means, and is arranged to deliver coherent energy thereto in time sequence for serial emission from the positions along the radiating-means array.

A detecting means is arranged in the hologram plane as a linear array oriented transversely to the radiating-means linear array. The detecting means is further arranged to receive energy from the object at a plurality of positions therealong. The detecting means can be a plurality of spaced-apart receiving transducers such as microphones or microwave antennas, or, alternatively, can be a single scanned receiving transducer. A receiver control means is connected to the detecting means, and is arranged to receive energy from each position of the detecting means array at least once for each energy emission from each position along the radiating-means array.

The receiver control means includes a receiver synchronizing system, and one or more preamplifiers and phase detectors for the array of receiving transducers. The phase detector output is filtered and used to control beam intensity in a cathode-ray oscilloscope for visual presentation of the hologram. Alternatively, digital-data techniques may be used to accumulate, process and store the amplitude and phase data from each data point in the hologram plane. The apparatus is adapted to provide a matrix of data points across the hologram plane using only two transversely oriented linear arrays of radiating and detecting transducers.

BRIEF DESCRIPTION OF THE DRAWINGS

FIG. 4 is a perspective view of a pair of transversely oriented linear arrays of microwave transducers for a radar holography system according to the invention;

FIG. 5 is a schematic block diagram of the holography system;

FIG. 7 is a schematic block diagram of a receiver subsystem;

FIG. 8 is a schematic block diagram of an alternative form of the holography system adapted for use with a digital computer;

DESCRIPTION OF THE PREFERRED EMBODIMENTS

An important feature of holography is that the object of which a hologram is to be made is viewed in two dimensions. Holograms made by conventional techniques will hereinafter be called area holograms to emphasize the property that either the transmitter or the receiver is extended in two dimensions by either scanning techniques or multi-element two-dimensional arraying of transducers. Holograms made according to the techniques and apparatus of this invention will hereinafter be referred to as conic holograms. This terminology is appropriate because the interference-fringe patterns of a conic hologram are displaced from the patterns of a conventional hologram in a manner related to the conical shape of the radiation pattern from a linear phased array. Area holography places both dimensions of the two-dimensional view at either the site of the energy radiator, or at the site of the energy receiver. Conic holography, on the other hand, splits the two dimensions, placing one at the transmitter array and the other at the receiver array.

Figure 1:
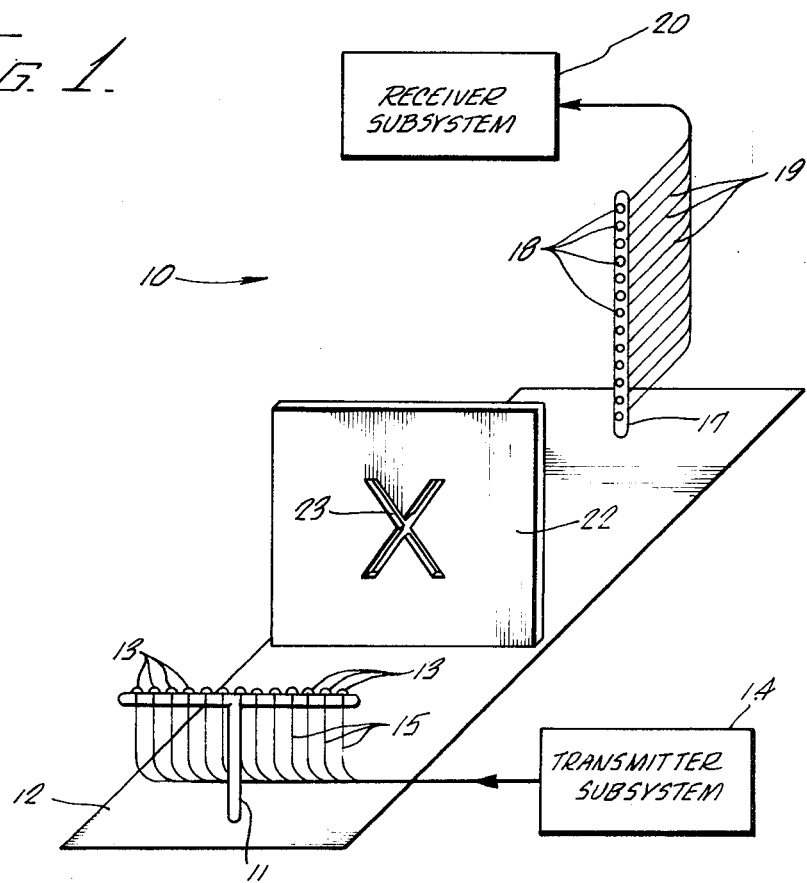
FIG. 1 is a schematic perspective view of a portion of a holography system according to the invention.

FIG. 1 shows a portion of an acoustic conic-holography system 10 according to the invention. A T-shaped bracket 11 is secured to a base 12, and a linear array of horizontally spaced sound-emitting transducers or transmitters 13 are arranged along the top of the bracket. A transmitter subsystem 14 delivers electrical energy through cables 15 to the transmitters. A second vertical bracket 17 is secured to the base and spaced from bracket 11. An array of microphone transducers or receivers 18 are secured to and vertically spaced apart along the vertical bracket. Sound energy received from the transmitters is converted to electrical energy by the receivers, and the electrical energy is transmitted through cables 19 to a receiver subsystem 20.

A demonstration target object 22 in the form of a flat plate is secured to the base between the arrays of transmitters and receivers. An X-shaped aperture 23 is cut through the plate, and only the sound energy which passes through the aperture reaches the array of receivers. This transmission-through-aperture arrangement is often used in demonstrating the principles of holography. The concepts of the invention, however, are also entirely useful in systems using receivers positioned to receive energy reflected from the object.

Figure 1A:
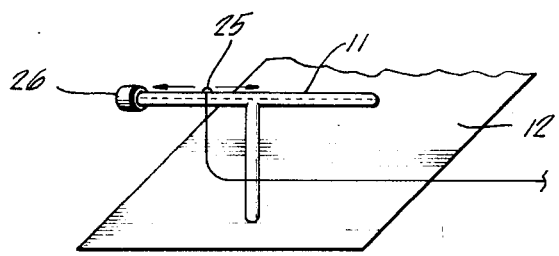
FIG. 1A is a fragmentary perspective view similar to a portion of FIG. 1 and showing a scanning transducer.

A modification of the system shown in FIG. 1 is to replace one of the linear arrays of transducers with a single transducer which is movably mounted to scan in a direction transverse to the other linear array of transducers. Either a transmitter or a receiver may be scanned, but a scanned transmitter is usually preferred to minimize system background noise and to reduce system cost. This arrangement is shown in FIG. 1A in which transmitters 13 are replaced by a single movable transmitter 25 mounted to scan horizontally along the length of bracket 11. The single transmitter can be scanned by a conventional electromechanical lead-screw 26, or other conventional drive systems can be used depending upon the requirements of the specific application.

For example, in marine applications where sound is being transmitted through water, a single transmitter can be mounted in a plastic tube to be mechanically or pneumatically propelled along the length of the tube during scanning. The bearing surface between the transducer and tube serves as an acoustic coupler which transmits sonic power into the water. The significant point about any of these configurations is that the transmitting and receiving transducers are positioned in transversely oriented arrays, and one of the arrays may be comprised of a single transducer which is lineally scanned.

Figure 3:
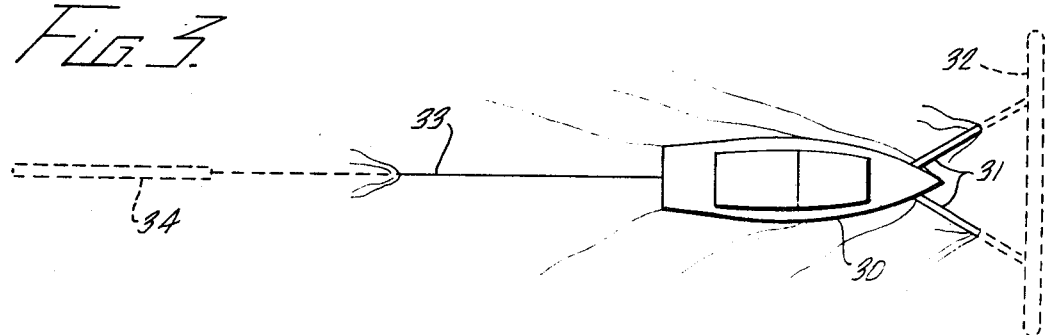
FIG. 3 is a plan view of the ship shown in FIG. 2.
Figure 2:
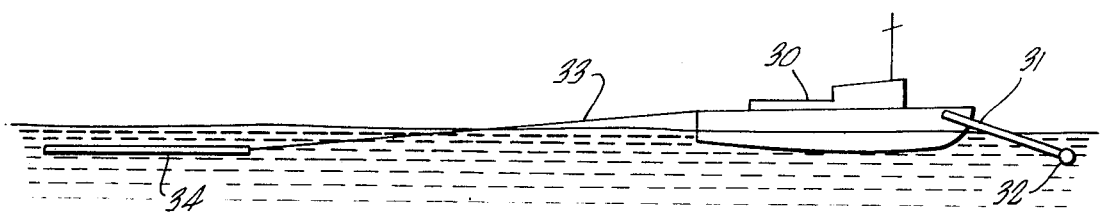
FIG. 2 is an elevation of a ship carrying crossed arrays of acoustic transducers for a holography system according to the invention.

An example of a marine use of the invention is shown in FIGS. 2 and 3 in which a ship 30 has a pair of booms 31 projecting forwardly from its bow. An elongated microphone bar 32 is secured to the ends of the booms, and extends transversely to the direction of motion of the ship. A plurality of energy-receiving transducers or microphones (not shown) are spaced apart along and mounted on the bar. The microphones are coupled by a cable (not shown) to an electronic system in the ship.

A tow line 33 extends from the stern of the ship and an elongated transmitter bar 34 is connected to the end of the tow line to stream behind the ship parallel to the direction of ship motion. A plurality of energy-emitting transducers or sound transmitters (not shown) are spaced along and secured to the transmitter bar. The transmitters are also coupled to the ship's electronic system by a cable (not shown). Both the microphone and transmitter bars are submerged in the water, and sonic energy is emitted by the transmitters, reflected by submerged objects and received by the microphones.

As suggested above, one of the linear arrays of transducers can be replaced by a single transducer which is movably mounted to scan in a direction transverse to the orientation of the other transducer array. Again, the significant feature is that the linear arrays of transducers are transversely oriented to each other. The arrangements described thus far involve arrays in which transducers are spaced apart along a straight line. It is to be understood, however, that the term "linear" is used in a broad sense, and the transducers of a single array could be spaced apart along a curved line. In either case, only a single dimension is necessary to specify the position of a specific transducer along the line, whether the line be straight or curved.

The concepts of the invention are useful in microwave holography as well as acoustic holography, and a land radar system 40 embodying the invention is shown in FIG. 4. In this system, a vertical support member 41 is rotatably mounted on a base 42 anchored to the ground. A horizontal support member 43 is secured to and extends laterally from vertical support member 41 to be supported at its free end by a movable carriage 44. A first array of microwave transducers or antennas 45 of the familiar parabolic type are secured to vertical support member 41 in spaced-apart linear alignment. A second array of microwave transducers or antennas 46 are secured to horizontal support member 43 in spaced-apart linear alignment.

The antennas are coupled by cables to an electronics system (not shown). One of the arrays of antennas is made up of transmitting antennas, and the other array is comprised of receiving antennas. The two arrays are oriented transversely to each other, just as in the case of the acoustic transducers discussed above. Carriage 44 can be driven by any conventional means to rotate the antenna arrays around base 42, whereby the system can be aimed at or scanned through any desired azimuth position.

A complete conic-holography system 50 according to the invention is shown in block-diagram form in FIG. 5. The system is arranged to provide $N^2$ data points arranged in an N-by-N square array. N transmitting transducers are arranged in a transmitting array 51 which is horizontally oriented to represent the X axis of the hologram plane. Similarly, N receiving transducers are arranged in a receiving array 52 which is vertically oriented to form the Y axis of the hologram plane. The transducers are either of the microwave type for propagating and receiving microwave energy in a radar-holography system, or of the acoustic type for propagating and receiving acoustic energy in an acoustic-holography system. The transducers are physically arranged in the manner described above with reference to FIGS. 1–4.

Overall system synchronization and control is provided by a control means including a transmitter synchronization pulse generator 54 connected to a transmitter subsystem 55 by two lines 56 and 57. Generator 54, which is of a conventional type, emits N pulses per complete data frame on line 56, and one pulse per complete frame on line 57.

Figure 6:
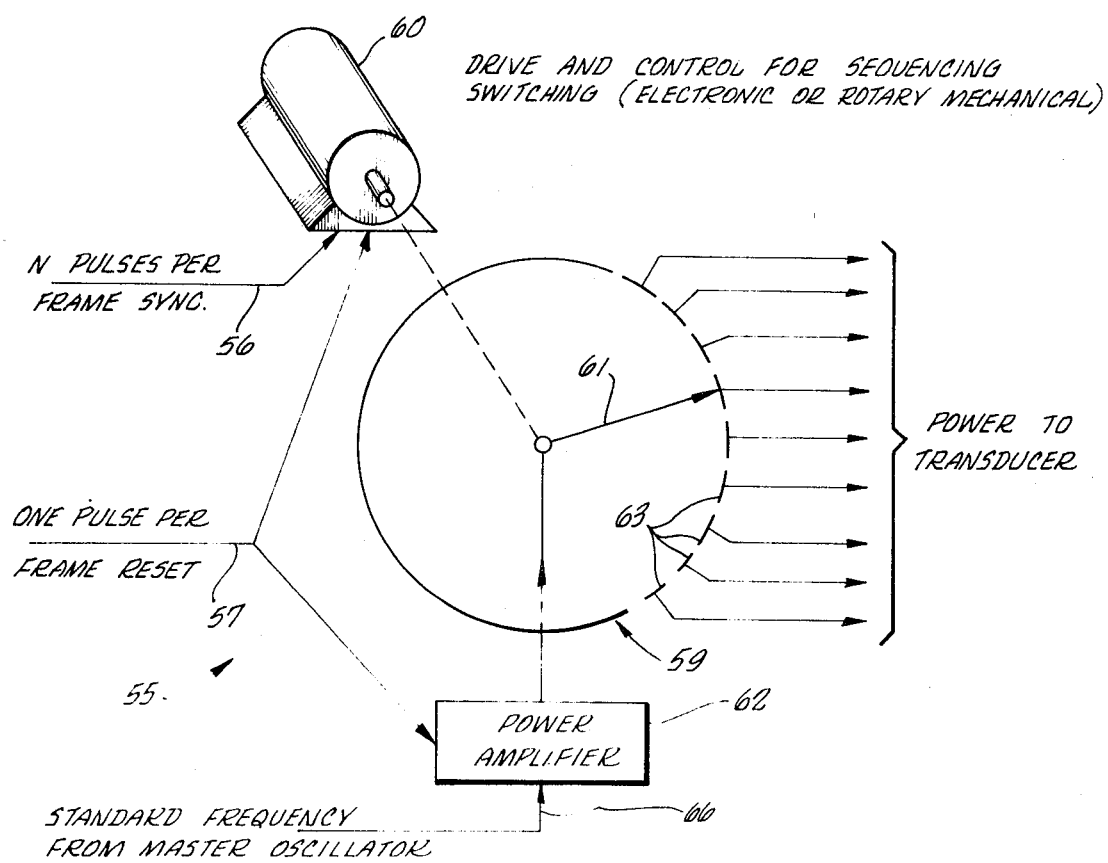
FIG. 6 is a schematic block diagram of a transmitter subsystem.

Transmitter subsystem 55 is shown in detail in FIG. 6, and includes a commutator or N-pole rotary switch 59 driven by an electromechanical stepping motor 60. An arm 61 of the switch is connected to the output of a power amplifier 62. Each of N poles 63 of switch 59 is connected to a separate transmitting transducer in transmitting array 51. Switch 59 can also be of a completely electronic type which is free of mechanical rotating parts.

Line 56 from pulse generator 54 is connected to stepping motor 60, and each pulse received from this line causes the switch to advance one position. During one data frame, the switch thus steps N times to connect arm 61 and power amplifier 62 to each of the N transmitting transducers in sequence. The single pulse per frame emitted on line 57 is used to reset the stepping motor at the end of a data frame in readiness for the next frame. A master oscillator 65 delivers a stable coherent signal to power amplifier 62 over a line 66, and this amplified signal drives the transmitting transducers sequentially as the switch is stepped through its N positions.

The single pulse per frame on line 57 is also delivered to a pulse-delay circuit 68 having a delay time which is adjustable to correspond to the nominal round-trip target range.

That is, the pulse delay introduced by circuit 68 is initially set to correspond to the approximate round-trip propagation time of energy emitted toward and reflected back from the target by the transmitting and receiving transducer arrays.

The delayed one-per-frame pulses emitted by delay circuit 68 are transmitted over an output line 69 which is branched to be connected to a receiver synchronization generator 70 and a cathode-ray oscilloscope 71. Line 69 is connected to trigger the X-axis sweep of the oscilloscope per data frame. Receiver synchronization generator 70 has two output lines 72 and 73. Line 72 is branched to be connected to the Y-axis sweep trigger of oscilloscope 71, and to a receiver subsystem 75.

The receiver synchronization generator is arranged to deliver at least N pulses per frame on line 72 for each trigger pulse received from delay circuit 68. The Y-axis sweep of the oscilloscope is thus triggered N times during a single data frame. The receiver synchronization generator is further arranged to deliver N pulses on output line 73 for each pulse emitted on line 72. That is, a single one-per-frame pulse from delay circuit 68 triggers the generation of N pulses per frame on line 72 and $N^2$ pulses per frame on line 73.

Receiver subsystem 75 is shown in block-diagram form in FIG. 7. This subsystem includes a separate preamplifier 77 connected to each of the receiving transducers in receiving array 52. The output of each preamplifier is in turn connected to a conventional phase detector 78, and each phase detector also receives an input from a common line 79 connected to master oscillator 65.

Ignoring a-c noise, the output of each phase detector is a d-c signal which is substantially constant for the duration of the pulse transmitted by the transducers and the transmitting array. The phase-detector output signal may be positive (in phase), negative (out of phase), or zero (indicating phase quadrature). The output of each phase detector is coupled by a line 80 to a conventional integrate-and-hold circuit 81 having an integration time constant approximately equal to the transmitted pulse duration. Circuits 81 behave as low-pass filters in the receiver subsystem.

Each integrate-and-hold circuit 81 is connected over a line 82 to a separate pole 83 of an N-pole commutator or switch 84 having an arm 85 connected to a receiver output line 86. Switch 84 advances one pole position $N^2$ times per data frame under the command of the $N^2$ pulses received on output line 73 from the receiver synchronization generator. The switch is reset after every N pulses by trigger pulses received from the receiver synchronization generator on line 72.

Referring to FIG. 5, receiver output line 86 from the receiver subsystem is connected to the usual Z-axis intensity-modulation control on oscilloscope 71. The intensity of the cathode-ray beam and the resulting luminous spot on the oscilloscope screen is accordingly controlled by the output signal received from receiver subsystem 75. When a full frame of data has been displayed on the oscilloscope screen, the screen is photographed by a camera (not shown) as is conventional in acoustic holography. The resulting photographic image provides an optical hologram from which the original target object is reconstructed using coherent illumination from a laser as in conventional optical holographic image reconstruction.

When the transmitter stepping sequence is relatively slow and the received signal is strong, the receiver subsystem can be considerably simplified by connecting the receiving-transducer output signals directly to the poles of switch 84. The arm of the switch is then connected to a single preamplifier, having an output which is in turn connected to a single phase detector. The phase detector receives a reference signal from master oscillator 65, and delivers an output intensity-modulating signal to the cathode-ray oscilloscope.

The date signals generated by the conic-holography system of this invention can also be processed by digital techniques instead of being presented on an oscilloscope for visual presentation and photographic storage. This variation is illustrated in a system 90 shown in block-diagram form in FIG. 8. The transmitter portion of this system is the same as the corresponding portion of system 50 described above. The receiver portion, however, is of an alternative type adapted to deliver digitized Fourier components of the data signals to a digital computer.

Output signals from each of the receiving transducers in receiving array 52 are coupled to separate preamplifiers 91, each of which has two outputs connected to a pair of phase detectors 92 which are arranged in phase quadrature. Alternatively, a single phase detector per receiving transducer may be used, but the quadrature detectors remove spurious images and provide higher image quality. Master oscillator 65 has an output line 93 connected to one of the detectors in each pair of phase detectors 92. The master oscillator also has a second output line 94 connected to the other detector in each pair of phase detectors through a 90° phase-shift network 95.

Each phase detector has an output line connected to a separate analog-to-digital converter 96 through separate low-pass filters 97. The analog-to-digital converters are commanded to digitize the signals from the phase detectors by pulses received on output line 73 from receiver synchronization generator 70. These pulses are also transmitted on a line 98 to a digital computer 99 to signal the start of a new column of data. A start-frame signal is delivered to the digital computer on a line 100 from delay circuit 68.

Each pair of analog-to-digital converters 96 is connected to the digital computer by a pair of lines 101. One of these lines carries a cosine Fourier component (plus for phase of 0°, and minus for phase of 180°) and a sine Fourier component (plus for phase of 90°, and minus for phase of 270°) for the data point in the hologram plane which is selected by the energization of specific pairs of receiving and transmitting transducers. As further discussed below, the conic-holography system of this invention has a significant advantage as compared to conventional area-holography systems when used with digital-reconstruction techniques.

The systems described above generate sets or frames of $N^2$ complex data points containing amplitude and phase information, and each set constitutes a virtual square hologram of N-by-N elements. The crossed linear transducer arrays collect these $N^2$ data points with only 2N transducers, or alternatively with only N + 1 transducers if a single scanned transducer is used in one array. The $(n,m)^{th}$ data point in this set is obtained by "listening" to the $m^{th}$ transmitter with the $n^{th}$ receiver in the transducer arrays.

The images and interference fringes generated by a conicholography system deviate slightly from those produced by an area-holography system. These deviations cause small aberrations in the image if it is reconstructed in coherent light without corrective measures. That is, if an image reconstruction system is adjusted to give an undistorted image from an area hologram, the substitution of a conic hologram will cause two aberrations which may be termed conic aberration and velocity aberration. These aberrations can best be understood by comparing the range geometry involved in conic and area holography.

Figure 9:
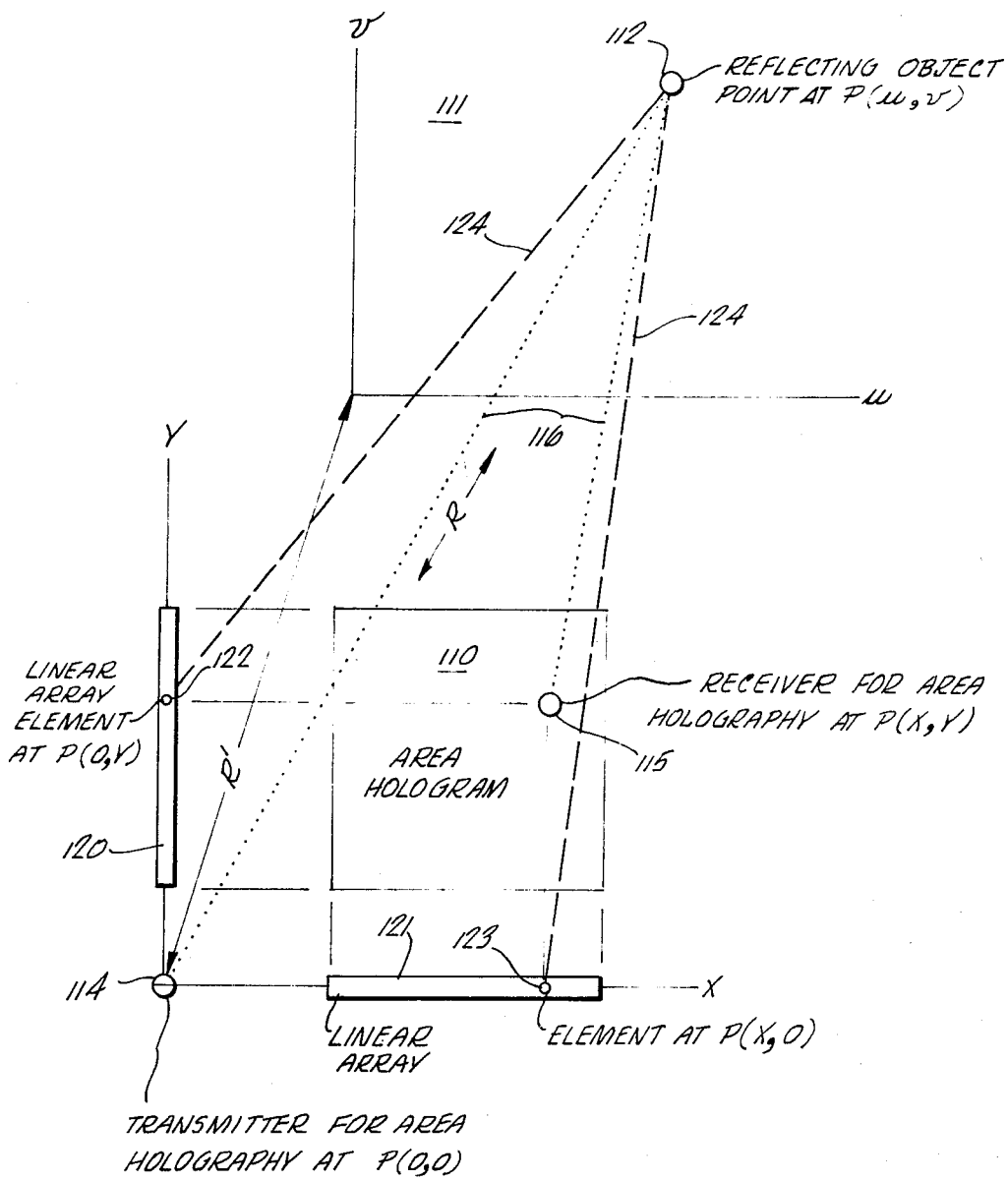
FIG. 9 is a diagram showing the propagation paths of energy used to form a hologram in a conventional system and in a system according to the invention.

FIG. 9 shows the geometry of conic and area holography superposed for comparison. The diagram as drawn applies to reflection holography, although the principles illustrated are equally applicable to transmission holography. An x-y coordinate plane 110 includes the hologram plane of the system, and the transmitting and receiving transducers are disposed in this plane. A u-v coordinate plate 111 is parallel to plane 110, and the two coordinate planes are spaced apart by a distance R'. A typical reflecting point 112 on the surface of an object being holographed is positioned at $P(u,v)$ in u-v coordinate plane 111.

A single area-holography coherent-energy transmitter 114 is positioned at the intersection of the x and y axes (at $P(0,0)$ in coordinate plane 110). An area-holography receiving transducer 115 is positioned at $P(x,y)$ in coordinate plane 110. The receiving transducer may be a single element which is scanned in both the x and y directions to generate a square matrix of data, or one of $N^2$ receiving transducers disposed in the x-y plane to form the data matrix. A dotted line 116 in FIG. 9 represents the round-trip propagation path of energy emitted by transmitter 114, reflected by object point 112 at $P(u,v)$ and received at receiving transducer 115 located at $P(x,y)$. The range of the reflecting object point from the origin or intersection of the x and y axes is designated as R in FIG. 9.

Crossed linear arrays 120 and 121 of transducers as used in a conic-holography system are also shown in FIG. 9. Array 120 is aligned along the y axis of coordinate plane 110, and array 121 is aligned along the x axis of this coordinate plane. One of the arrays such as array 120 contains the transmitting transducers of the system, and the other array contains the receiving transducers. As explained above, one array may also comprise a single transducer which is movably mounted to scan linearly in a direction transverse to the orientation of a plurality of transducers in the other array.

Assuming that each array 120 and 121 contains N transducers, a transmitting transducer 122 is positioned at $P(0,y)$ and a receiving transducer 123 is positioned at $P(x,0)$ in the x-y coordinate plane. A dashed line 124 in FIG. 9 represents the round-trip propagation path from transmitting element 122 to the reflecting object point at $P(u,v)$ and back to receiving element 123 on the x axis.

It can be shown from the geometry of FIG. 9 that a slight difference exists in the propagation path lengths in the area and conic-holography systems. Letting $r_a$ equal the propagation path length in the area-holography system, and $r_c$ equal the propagation path length in the conic-holography system, the following expressions can be derived from the geometric relationships of the coordinate plane, transducers, and reflecting object point:

Area holography: $r_a = [R'^2+u^2+v^2]^{1/2} + [R'^2+(x-u)^2+(y-v)^2]^{1/2}$ (1a)

Conic holography: $r_c = [R'^2+(x-u)^2+v^2]^{1/2} + [R'^2+u^2+(y-\alpha o)^2]^{1/2}$ (1b)

Putting $R^2 = R'^2 + u^2 + v^2$, the square roots in expressions (1a) and (1b) above can be expanded in powers of $(x, y, u$ and $v)/R$. The second order terms in $x^2, y^2, ux$ and $vy$ are identical in the two expressions:

$$r_a \approx r_c \approx 2R - R^{-1}[ux+vy-(x^2+y^2)/2]$$

To discuss the relative phase of echoes from points $P(u,v)$, the large constant term $2R$ can be dropped, and the phase-reference signal in the receiver can be ignored since the most natural comparison uses identical reference signals. It then follows that:

$$\phi_a = (2\pi/\lambda)\Delta r_a, \quad \phi_c = (2\pi/\lambda)\Delta r_c$$

and $$\phi_a \approx \phi_c \approx (2\pi/\lambda R)[ux+vy-(x^2+y^2)/2],$$

where $\phi$ is phase in radians and $\lambda$ is wavelength of the coherent energy "illuminating" the object.

The equality of second order terms establishes the interchangeability of the two types of holograms when only paraxial rays are in use. These terms represent wavefront tilt and parabolic curvature in the ordinary point-transmitter case.

Next to be considered are higher order terms in the above expansion which affect rays farther off axis. The dominant term in the phase difference between conic and area holograms can be shown to be:

$$\phi_c - \phi_a = (2\pi/\lambda)(xyuv/R^3) + \text{terms of order }[(x,y)^3 \cdot (u,v)/R^3]$$

The designation of this term as "dominant" assumes that hologram size (which limits x and y) is much smaller than the object field (which limits u and v). Hence, the xyuv term is considered large compared to $xy^2u$, for example. It is not possible to correct this aberration by adjusting the phase-reference signal or other phase shifts in the receiver because the phase correction in the +x, +y quadrant of the hologram should be negative for that part of the echo coming from the +u, +v quadrant of the field, and positive for that part coming from the +u, -v quadrant, and so on.

During the coherent-light optical reconstruction of a conic-hologram image, it is possible to correct this conic aberration using optical correction plates at different distances from the hologram. In the design of correcting optics, it is permissible to produce the hologram with a pincushion or barrel distortion. The conic aberration just described is dependent on target range, and is not generally significant when the range exceeds a value approximately represented by the expression $\alpha^2 L^2/16\lambda$ where L is the array length and $\alpha$ is the full angular field of view of the system. Even with shorter ranges, the conic aberration is not necessarily serious and a greater degree of image degradation is likely to result from unavoidable disturbances in a propagation medium such as sea water.

A second type of aberration in a reflection conic-holography system may be called velocity aberration. This aberration is best understood by considering the problem of how a received "echo" from the target can be assigned to its proper position in the conic hologram. An exact position assignment cannot be achieved if very brief pulses are used, and the serially arranged transducers in each array are fired in rapid sequence without the further limitation that all echoes come from the same distance, in which case the return echoes are automatically properly sequenced in the same order as the corresponding pulses were transmitted. However, in a more realistic case, echoes from more distant points in the object field arrive after a delay longer than one pulse interval. There is then no way to "unscramble" the echoes to identify delays caused by propagation time as distinguished from delays that "tag" the transmitting element.

Arbitrarily let the transmitter scan direction be the $x$ axis which is scanned from zero to L at a velocity V, and let $c$ be the velocity of sound in an acoustic medium surrounding a conic-holography system. It then follows that the instantaneous signal being received at time $t$ after the first transmission can come from any range $r$ and any transmitter position $x$ that satisfy the following time-delay equation:

$$t = 2r/c + x/V \qquad (2)$$

The first term on the right side of equation (2) represents propagation delay, and the second term represents scan delay. Normally the signal being recorded at $t$ will be superposition of many echoes having many different values of $x$ and $r$ that satisfy this equation.

Next consider an object field with only a single object that is small enough to act as a point reflector. There is then only one pertinent value of range in equation (2), and the propagation delay becomes a constant $t_0 = 2r/c$. In this case, a receiver can write a well-defined hologram on an oscilloscope, the hologram dimensions $(x'y')$ being scaled by a factor $k$ from the array dimensions. That is:

$x' = kx = kV(t-t_0),$
$y' = ky.$

The oscilloscope writes the $y'$ dimension rapidly by sampling N receivers connected to the array of N hydrophones or receiving transducers, and simultaneously writes the $x'$ dimension relatively slowly at a rate $kV$ that corresponds to the transmitter scan rate. The resulting hologram is a familiar point-reflector hologram 130 shown in FIG. 10.

Figure 10:
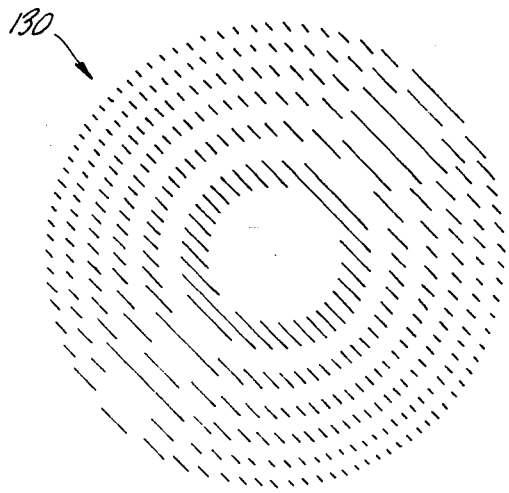
FIG. 10 is a schematic representation of a hologram of a point reflector.
Figure 11:
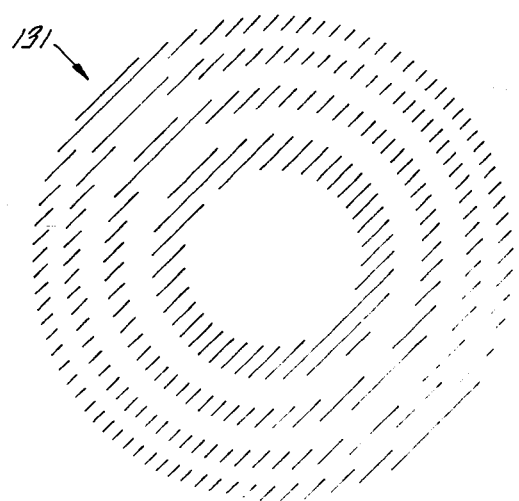
FIG. 11 is a view similar to FIG. 10 but showing a hologram of a point reflector at a greater range.

The circular patterns in FIG. 10 (as well as in FIGS. 11–13) represent interference fringes, and the cross-hatching in the drawing is for shading only. FIG. 11 is a hologram 131 of another point reflector at a greater range than the range of the point reflector represented in the hologram in FIG. 10. The fringes of hologram 131 are generally similar to but wider than the fringes of hologram 130.

Figure 12:
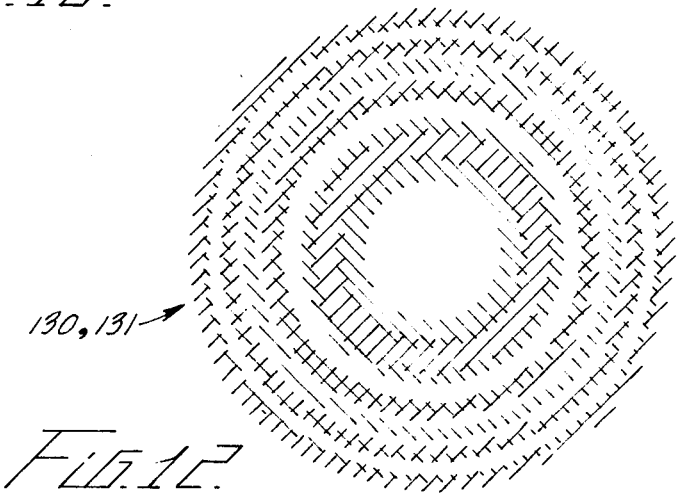
FIG. 12 is a schematic representation of a hologram of two point reflectors made by conventional techniques.

Next assume that the target field contains two point reflectors, both on the central axis, and with one at the original range (FIG. 10) and one at the longer range (FIG. 11). An area hologram in this case is a concentric superposition of the two single reflector holograms as shown in FIG. 12. Coherent radiation (as from a laser) falling on a transparency of this hologram will come to focus at two points, one corresponding to each reflector.

Figure 13:
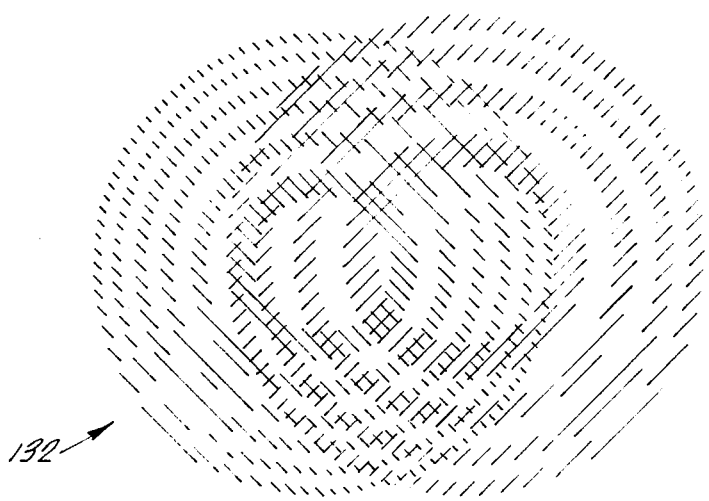
FIG. 13 is a view similar to FIG. 12 but showing a hologram made by a system according to the invention.

FIG. 13 shows a hologram 132 which results from the use of the conic-holography system of this invention with the same two point reflectors at different ranges as just described. Using the crossed linear transducer arrays described above with a transmitter scanning from left to right, the fringe pattern of the more distant object will be shifted to the right because the echoes from the more distant object arrive later due to a greater propagation time. When this conic-hologram image is reconstructed, each image point comes to a focus along the axis of its own fringe pattern, and the image is accordingly distorted somewhat with more distant points displaced to the right. Accordingly, the conic hologram should normally be rectangular in form, with the long axis along the transmitter axis in order to accommodate late echoes.

This same approach can be extended to synthesize the echo of a real target with a large number of point reflectors. Objects which are actually lined up one behind another will image along a line having a slope $$-(dx/dr) = 2V/c \qquad (3)$$

Equation (3) is the derivative of equation (2) with t held constant above. In dense acoustic media, this velocity distortion will normally be very small because $V \ll c$. The scan rate is $V = L/T$ where $T$ is the scan time, a quantity which can be optimized. If $R_{min}$ is the minimum range in which the system is expected to function, then $T$ should not exceed $2r/c$ so the transmitter is off when the return echo from $R_{min}$ arrives.

In the discussion above on conic aberrations, the fringe shifts of a conic hologram were treated as though they were a distortion that can complicate optical-image construction. When digital reconstruction techniques are used, this situation is reversed. For any specified accuracy beyond that at which conic and area holography are equivalent, one can devise a much faster computer program for conic holography. This results from the conic pattern factoring into x and y patterns which are readily handled by digital techniques.

To develop this point further, consider an N-by-N matrix of holographic data $H_{mn}$. The evaluation of a single image point at position $(u,vR)$ requires evaluation of an image sum of $N^2$ terms having the form $$I(u, v, R) = \sum_{m,n=1}^{N} H_{mn} M_{mn}(u, v, R)$$

where $M$ is the hologram-to-image conversion matrix. In the general case of area holography, this expression requires excessive computer time to evaluate the many elements of $M_{mn}$, each of which involves the square root in equation (1a) above. However, in conic holography, equation (1b) replaces equation (1a) and, after substituting $R^2 = R' + u^2 = v^2$, and using the abbreviation *exp* to designate a power to which natural-logarithm base $e$ is raised:

$$M_{mn} = exp\left\{(2\pi i/\lambda)\,[R^2 + x_m^2 - 2ux_m]^{1/2}\right\} \cdot exp\left\{(2\pi i/\lambda)\,[R^2 + y_n^2 - 2vy_n]^{1/2}\right\}$$

It is thus seen that $M$ factors into an $(x_m, u)$ dependent part and a $(y_n, v)$ dependent part:

$$M_{mn} = X_m(u, R) \cdot Y_n(v, R)$$

As the arrays X and Y are only N long, they can be stored in the random-access memory of a digital computer, making all $N^2$ values of $M_{mn}$ readily available. The digital reconstruction system discussed above with reference to FIG. 8 thus becomes a practical configuration by virtue of the unusual properties of conic holography.

It is to be emphasized that conic holography is not to be confused with conventional crossed arrays in which all of the array elements along both axes of the cross are either receivers or transmitters but not a mixture of the two kinds of transducers. When all 2N elements receive, the system can only collect 2N complex data in one complete "look" at the target. By contrast, crossed arrays of N receivers and N transmitters collect $N^2$ complex data points in one complete "look." Conic holography thus forms a complete hologram by listening with each receiver to all N transmitters in sequence. More time and energy is required for the sequence of pulses that constitute the conic-holography "look" at the object. However, power is seldom the factor that limits the ability to examine an object acoustically, and the time required for a pulse sequence is much shorter than the time consumed in a conventional two-dimensional holographic scan.

There has been described a novel conic-holography system using crossed linear arrays of receiving and transmitting transducers for emitting coherent energy toward and receiving energy from a target object of which a hologram is to be formed. It is to be understood that the linear arrays of transducers need not necessarily be arranged in straight lines, need not be in the same plane, and also need not cross each other. As emphasized above, one of the transducer arrays can also be a single transducer which is movably mounted to scan along a lineal dimension. The conic-holography system avoids the practical problems inherent in an area-holography system using a very large number of transducers arranged in a matrix, and similarly avoids the drag and turbulence problems involved in scanning an array of transducers in a direction transverse to the direction of orientation of the array.

Although the system has been described primarily in terms of its use in acoustic holography, the principles described are equally applicable to radar or microwave holography. This is especially true in airborne mapping applications where one array of transducers is arranged along the span of an aircraft wing, and the other transducer array is synthesized by a single transducer which is scanned by the motion of the aircraft. The invention is believed to be a significant improvement to known holography systems, and it makes possible the production of high-quality holographic images with a sharply reduced number of transducers and related signal-processing and system-synchronizing electronic components.

What is claimed is:

1. In a system for forming a hologram of an object by irradiating the object with coherent wave energy and receiving such energy as modified by the object at a plurality of points in a hologram plane to determine phase at each point, an improved energy emitting and receiving apparatus comprising:

radiating means arranged as a linear array to emit energy toward the object from a plurality of positions therealong;

transmitter control means connected to the radiating means and arranged to deliver coherent energy thereto in time sequence for serial emission from the positions along the radiating-means array;

detecting means arranged in the hologram plane as a linear array oriented transversely to the radiating-means linear array, and arranged to receive energy from the object at a plurality of positions therealong; and receiver control means connected to the detecting means and arranged to receive energy from each position of the detecting-means array at least once for each energy emission from each position along the radiating-means array so a matrix of data points across the hologram plane is obtained with only two transversely oriented linear arrays of radiating and detecting means.

2. The improvement defined in claim 1 in which one of the linear arrays in the radiating and detecting means includes a plurality of spaced-apart transducers arranged therealong, and the other linear array includes a single transducer which is mounted to be movable transversely with respect to object direction therefrom.

3. The improvement defined in claim 2 in which the plurality of spaced-apart transducers are in the detecting-means array, and the single transducer is in the radiating-means array.

4. The improvement defined in claim 3 in which the transducers are of a type adapted for use with acoustic energy.

5. The improvement defined in claim 3 in which the transducers are microwave antennas.

6. The improvement defined in claim 1 in which each of the linear arrays in the radiating and detecting means includes a plurality of spaced-apart transducers arranged therealong.

7. The improvement defined in claim 6 in which the transducers are of a type adapted for use with acoustic energy.

8. The improvement defined in claim 6 in which the transducers are microwave antennas.

9. In a system for forming a hologram of an object by irradiating the object with coherent wave energy and receiving such energy as modified by the object at a plurality of points in a hologram plane to determine phase at each point, an improved energy emitting and receiving apparatus comprising:

radiating means arranged as a linear array to emit energy toward the object from a plurality of positions therealong;

detecting means arranged in the hologram plane as a linear array oriented transversely to the radiating-means linear array, and arranged to receive energy from the object at a plurality of positions therealong; and control means connected to the radiating means for delivering energy thereto in pulsed sequence, and connected to the detecting means for receiving energy therefrom, the control means being synchronized to receive energy from each position along the detecting-means array at least once for each energization of each position of the radiating-means array so a matrix of data points across the hologram plane is obtained with only two transversely oriented linear arrays of radiating and detecting means.

10. A holography system, comprising:

transmitter means for irradiating an object with pulses of coherent energy from each of $m$ positions of a spacial array of transmitting positions, and including a transmitter synchronizing means for sequencing emission of energy serially through the $m$ positions;

receiver means for receiving the energy as modified by the object at each of $n$ positions of a spacial array of receiving positions which are spaced from and complementary to the transmitting positions so propagation paths of the energy are substantially geometrically equivalent to propagation paths in an area-holography system, the receiving means being operative to receive energy reaching the $n$ positions and transmitted from each of the $m$ positions to generate $mn$ holographic data points for each sequencing of the transmitter means through the $m$ positions; and means for arranging the $mn$ data points as a virtual hologram from which an image of the object can be reconstructed.

11. The system defined in claim 10 and further comprising a delay means connected between the transmitter means and receiver means to delay initiation of reception at the $n$ positions after emission of energy from each of the $m$ positions by a period representative of propagation time of the object-irradiating energy along the propagation paths.

* * * * *

PO-1050
(5/69)

UNITED STATES PATENT OFFICE
CERTIFICATE OF CORRECTION

Patent No. 3,685,051            Dated August 15, 1972

Inventor(s) Willard H. Wells

It is certified that error appears in the above-identified patent and that said Letters Patent are hereby corrected as shown below:

Column 5, line 23, after "screw" insert --drive--.

Column 7, line 25, after "oscilloscope" insert --once--.

Column 8, line 26, change "date" to --data--.

Column 9, line 36, change "plate" to --plane--.

Column 10, formula (1b) appearing at lines 22-23 should read as follows:

$$r_c = \left[R'^2+(x-u)^2+v^2\right]^{\frac{1}{2}} + \left[R'^2+u^2+(y-v)^2\right]^{\frac{1}{2}}$$

Column 12, lines 41-42, change "with t held constant above" to --above with t held constant--.

Signed and sealed this 30th day of January 1973.

(SEAL)
Attest:

EDWARD M. FLETCHER, JR.            ROBERT GOTTSCHALK
Attesting Officer                     Commissioner of Patents